(No Model.)
A. ANDERSON & R. RUTHERFORD.
TWO HORSE HAY RAKE.
No. 337,111. Patented Mar. 2, 1886.
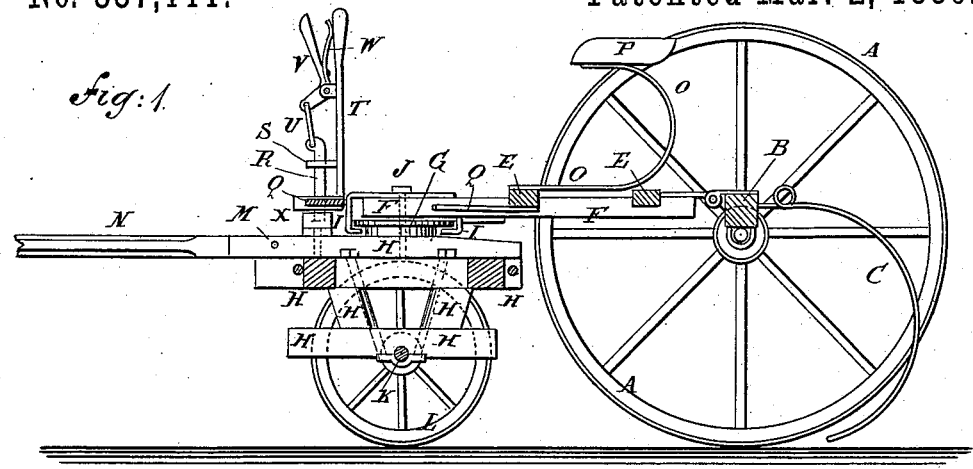
Fig. 1.
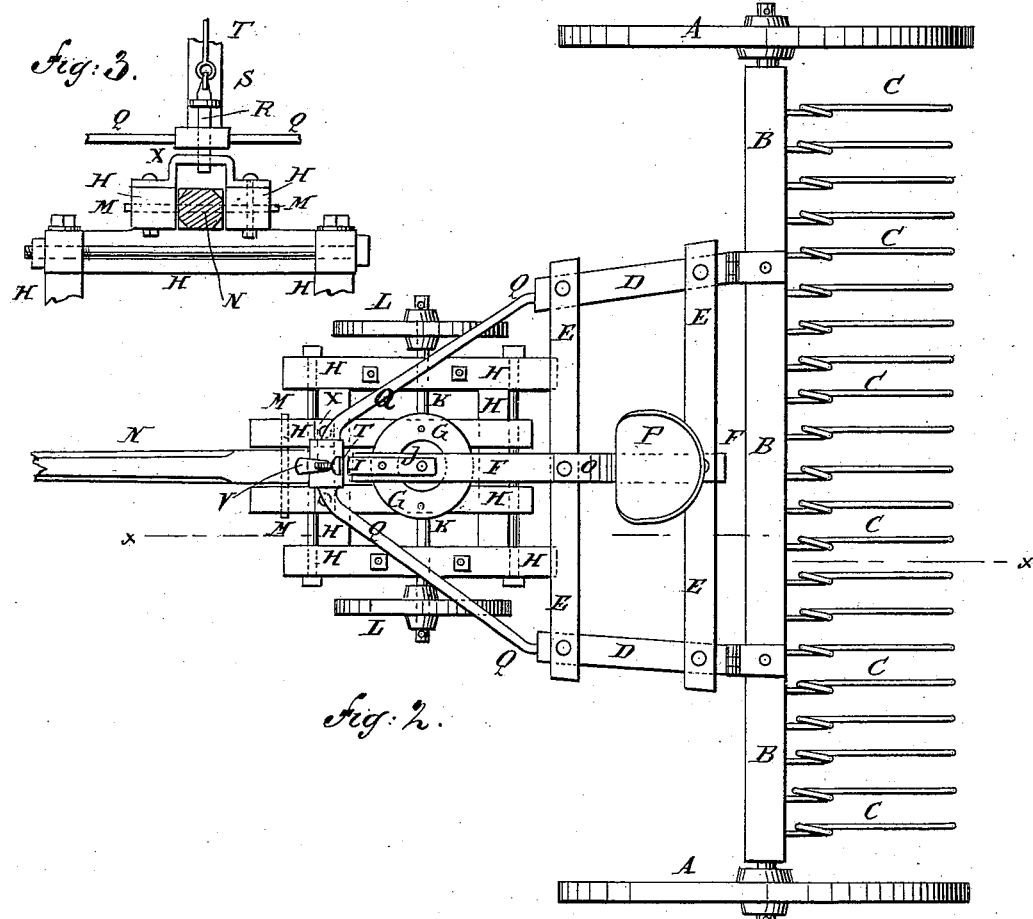
Fig. 3.
Fig. 2.
WITNESSES:
Chas. Nieta
C. Sedgwick
INVENTOR:
A. Anderson
R. Rutherford
BY Munn & Co.
ATTORNEYS.

UNITED STATES PATENT OFFICE.

ALEXANDER ANDERSON AND ROBERT RUTHERFORD, OF BRUSH CREEK, IOWA.

TWO-HORSE HAY-RAKE.

SPECIFICATION forming part of Letters Patent No. 337,111, dated March 2, 1886.

Application filed December 12, 1884. Serial No. 150,182. (No model.)

*To all whom it may concern:*

Be it known that we, ALEXANDER ANDERSON and ROBERT RUTHERFORD, both of Brush Creek, in the county of Fayette and State of Iowa, have invented a new and useful Improvement in Two-Horse Hay-Rakes, of which the following is a full, clear, and exact description.

Reference is to be had to the accompanying drawings, forming part of this specification, in which similar letters of reference indicate corresponding parts in all the figures.

Figure 1 is a sectional side elevation of one of our improved hay-rakes, taken through the line *x x*, Fig. 2. Fig. 2 is a plan view of the same. Fig. 3 is a front elevation of the upper part of the truck, the tongue being shown in section.

The object of this invention is to provide two-horse hay-rakes constructed in such a manner that the horses' necks will be entirely relieved from supporting any part of the weight of the rake.

The invention consists in a two-horse hay-rake constructed with a truck connected with the reach-frame of the rake by hooks on the reach-frame engaging an annular plate, and a king-bolt forming a fifth-wheel, and provided with a hinged tongue, whereby all weight from the rake will be taken from the horses' necks.

The invention further consists in the combination, with the truck-frame and the reach-frame connected with the rake, of a bail provided with a standard and a spring-lever pawl and a catch-plate, whereby the connection between the truck and rake can be made rigid, as will be hereinafter fully described, and then claimed.

A are the wheels, B is the axle, and C are the teeth of a two-horse hay-rake. To the axle B are hinged the ends of two short bars, D, which are connected by two cross-bars, E. To the centers of the cross-bars E is attached the rear part of a bar, F, the projecting forward end of which rests upon an annular plate, G, attached to the truck-frame H. The bar F thus serves as a reach, and is connected with the annular plate G by two hooks or keepers, I, attached to the said bar F, and which are bent to pass around the outer edge and overlap the lower side of the forward and rear parts of the said annular plate G, forming a fifth-wheel. The bar F is further connected with the truck-frame H by a king-bolt, J, placed at the center of the annular plate G. The truck-frame H is provided with an axle, K, and wheels L. To the forward ends of the central bars of the truck-frame H is hinged, by a bolt, M, the tongue N, to which the draft is applied in the ordinary manner.

To the center of the forward cross-bar E is attached the lower arm of a U-shaped spring, O, to the upper arm of which is attached the driver's seat P.

With this construction all weight, except the weight of the tongue N, will be taken from the horses' necks, and the rake A B C can be guided and controlled with as much ease and accuracy as when the draft is attached directly to the said rake.

To the forward ends of the hinged bars D are attached the ends of a curved bar, Q, the center of which is widened, and is perforated to receive the pawl R, which slides in guides S, attached to the standard T, attached to the center of the curved bail Q. The upper end of the pawl R is pivoted to the lower end of the short connecting-rod U, the upper end of which is pivoted to the short arm of a small elbow-lever, V. The elbow-lever V is pivoted at its angle to the upper part of the standard T, and its long arm is held outward, holding the pawl R pressed downward by a spring, W, attached to it and resting against the said standard T. The lower end of the pawl R, when the axle of the truck is parallel with the axle of the rake, enters a perforation in the catch-plate X, attached to the forward middle part of the truck-frame H, and makes the connection between the truck and rake rigid. When the rake is to be turned, the pawl R is withdrawn from the catch-plate X.

Having thus described our invention, what we claim as new, and desire to secure by Letters Patent, is—

1. In a two-horse hay-rake, the combination, with the rake A B C and the truck H K L, having a pivoted tongue, N, of the reach-frame D E F, the annular plate G, attached to the truck-frame, the hooks I, attached to the bar F of the reach-frame and engaging the annular plate, and the king-bolt J, passing through the bar F and the plate G, substantially as herein shown and described.

2. The combination, with the truck-frame H and the reach-frame D E F of a hay-rake, of the bail Q, the standard T, the spring-lever pawl R U V W, and the catch-plate X, substantially as herein shown and described, whereby the connection between the truck and rake can be made rigid, as set forth.

ALEXANDER ANDERSON.
ROBERT RUTHERFORD.

Witnesses:
AMOS RITTENHOUSE,
JACOB H. WALRATH.